US 6,716,404 B2

(12) United States Patent
Masaki et al.

(10) Patent No.: US 6,716,404 B2
(45) Date of Patent: Apr. 6, 2004

(54) PROCESS FOR THE PURIFICATION OF EXHAUST GASES

(75) Inventors: Shinyuki Masaki, Himeji (JP); Noboru Sugishima, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 133 days.

(21) Appl. No.: 09/740,971

(22) Filed: Dec. 21, 2000

(65) Prior Publication Data

US 2001/0006613 A1 Jul. 5, 2001

(30) Foreign Application Priority Data

Dec. 28, 1999 (JP) ........................... 11-374120
Dec. 28, 1999 (JP) ........................... 11-374128

(51) Int. Cl.[7] .............................. B01J 8/00; B01J 23/00
(52) U.S. Cl. .................... 423/213.2; 423/212; 502/309; 502/350
(58) Field of Search .............................. 423/213.2, 212; 502/309, 350

(56) References Cited

U.S. PATENT DOCUMENTS

| 4,649,703 A | * | 3/1987 | Dettling et al. ................ 60/275 |
| 4,728,503 A | * | 3/1988 | Iida et al. .................... 422/169 |
| 4,891,348 A | * | 1/1990 | Imanari et al. ............... 502/309 |
| 5,051,391 A | * | 9/1991 | Tomisawa et al. ............ 502/242 |
| 5,276,250 A | | 1/1994 | Hagenmaier et al. ........ 588/213 |
| 5,387,734 A | | 2/1995 | Hagenmaier et al. ........ 588/207 |
| 5,403,366 A | * | 4/1995 | Leininger et al. .......... 48/197 R |
| 5,430,230 A | | 7/1995 | Mitsui et al. ................ 588/206 |
| 5,497,620 A | * | 3/1996 | Stobbe ........................ 60/303 |
| 5,645,806 A | | 7/1997 | Hess et al. .................. 423/240 |
| 6,116,169 A | * | 9/2000 | Miyoshi et al. ............. 110/216 |
| 6,120,747 A | * | 9/2000 | Sugishima et al. ......... 423/240 |

FOREIGN PATENT DOCUMENTS

| DE | 4412207 | 10/1995 |
| EP | 0547226 | 6/1993 |
| EP | 0600440 | 6/1994 |
| EP | 0787521 | 8/1997 |
| EP | 0850676 | 7/1998 |
| JP | 02035914 | 2/1990 |
| JP | 5245343 | 9/1993 |
| JP | 638863 | 5/1994 |
| JP | 775720 | 3/1995 |
| JP | 10235191 | 9/1998 |
| JP | 2916259 | 4/1999 |
| JP | 180933 | 7/1999 |
| JP | 11239706 | 9/1999 |
| JP | 2000-42409 | 2/2000 |
| JP | 2000-61305 | 2/2000 |

* cited by examiner

*Primary Examiner*—Stanley S. Silverman
(74) *Attorney, Agent, or Firm*—Roylance, Abrams, Berdo & Goodman, L.L.P.

(57) ABSTRACT

The present invention provides a process for the purification of exhaust gases which process enables to effectively inhibit the discharge of the dioxins by low-cost modification of already existing incineration facilities which are formed from an incinerator and an electric dust collector or cyclone. Incinerator exhaust gases a dedusted with an electric dust collector or cyclone, and then treated with a ceramic filter to sufficiently remove dust from the exhaust gases and brought into contact with a catalyst to decompose and thereby remove the dioxins which are contained in the exhaust gases.

13 Claims, 1 Drawing Sheet

PROCESS FOR THE PURIFICATION OF EXHAUST GASES

BACKGROUND OF THE INVENTION

A. Technical Field

The present invention relates to a process for the purification of exhaust gases. Specifically, the invention relates to a process for the purification of exhaust gases which process enables a long-time stable removal of harmful substances (e.g. dioxins) that are contained in exhaust gases from incinerators.

B. Background Art

Many of already existing incinerators are types for the purification of their exhaust gases with an electric dust collector or cyclone to thereby dedust the exhaust gases, and then discharging the exhaust the exhaust gases into the air. However, the merely dedusted exhaust gases contain harmful substances such as dioxins (in the present invention, these harmful substances are referred to as dioxins) and therefore involve socially serious problems.

As to the removal of the dioxins, effective processes are developed, and the problems of the dioxins can considerably be solved by newly planting incinerators which utilizes these new technologies.

However, it is economically difficult to immediately dismantle the already existing incinerators and then newly plant the incinerators which utilizes the new technologies. Therefore, it is desired to enable to solve the problems of the dioxins by utilization of already existing incineration facilities without construction for much modification.

SUMMARY OF THE INVENTION

A. Object of the Invention

An object of the present invention is to provide a process for the purification of exhaust gases which process enables to effectively inhibit the discharge of the dioxins by low-cost modification of already existing incineration facilities which are formed from an incinerator and an electric dust collector or cyclone.

B. Disclosure of the Invention

The present inventors have found from their studies the following:

(1) The dioxins can effectively be removed by placing a catalyst downstream from the electric dust collector or cyclone.

(2) The dust collection efficiency of the electric dust collector or cyclone is so bad that the dust removal is insufficient. The catalyst can decompose gaseous dioxins, but cannot remove either dioxins contained in dust or particulate dioxins. The dioxins are usually measured in total of dusty, particulate, and gaseous dioxins. As a result, therefore, a sufficiently high dioxins-removing ratio cannot be achieved.

(3) Setting a bag filter in place of the electric dust collector or cyclone might be though of, but its displacement construction costs much. The bag filter exhibits so high a dust collection efficiency as to be able to remove most of the dusty and particulate dioxins. However, the operational temperature of the bag filter is so low that the amount of the catalyst needs to be increased for sufficiently decomposing the dioxins with the catalyst. As a result, there are economical disadvantages. In addition, the low operational temperature involves the inclusion of sulfur oxide in the exhaust gases and therefore causes problems of catalyst deterioration. Incidentally, a method in which exhaust gases purified by the bag filter is heated and then introduced into the catalyst might be thought of, but the heating results in an increase of costs.

(4) The dioxins can effectively be removed from exhaust gases by setting a ceramic filter downstream from the electric dust collector or cyclone in order to enhance the dedusting efficiency, thereby sufficiently removing dust from exhaust gases, and then introducing the exhaust gases into the catalyst. Furthermore, the durability of the catalyst can also thereby be enhanced.

(5) If exhaust gases are purified with a ceramic filter which supports a catalyst, then the resultant effects are the same as those obtained in the above case where the exhaust gases are dedusted with a ceramic filter and then brought into contact with the catalyst.

The present invention has been completed on the basis of the above findings.

That is to say, a process according to the present invention for the purification of exhaust gases comprises the steps of:

(A) dedusting incinerator exhaust gases with an electric dust collector or cyclone and then (B) bringing the exhaust gases into contact with a catalyst and (C) treating the exhaust gases with a ceramic filter.

Specifically, for example, the above process according to the present invention for the purification of exhaust gases can preferably be executed by: a first process in which step (B) is carried out after step (C); or a second process in which step (B) is carried out at the same time as step (C); or a third process in which step (C) is carried out after step (B).

These and other objects and the advantages of the present invention will be more fully apparent from the following detailed disclosure.

DETAILED DESCRIPTION OF THE INVENTION

The dioxins which are targets in the present invention are those which are generally called dioxin, and specific examples thereof include polyhalogenated dibenzoparadioxins, polyhalogenated dibenzofurans, and polyhalogenated biphenyls.

Hereinafter, the above specific processes according to the present invention are described.

Figure 1:
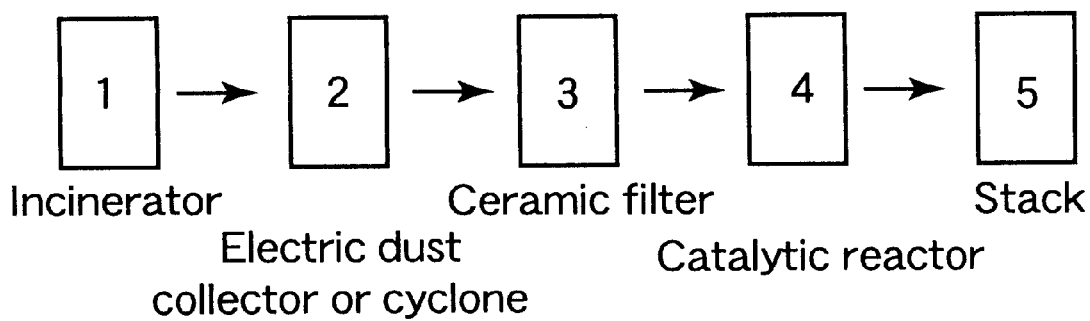
FIG. 1 is a systematic flowchart of the first process of the processes according to the present invention.

(First Process):

FIG. 1 is a systematic flowchart of a process according to the present invention. In FIG. 1, "1" is an incinerator, "2" is an electric dust collector (or cyclone), "3" is a ceramic filter, "4" is a catalytic reactor, and "5" is a stack.

Exhaust gases from the incinerator 1 are dedusted by introducing the exhaust gases into the electric dust collector (operational temperature: 200 to 500° C.) 2 (whereby the dust concentration in the exhaust gases is reduced into the range of about 20 to about 100 mg/m$^3$), and then further dedusted by introducing the exhaust gases into the ceramic filter 3 so that the dust concentration in the exhaust gases will be reduced to not more than 10 mg/m$^3$. Then, the exhaust gases from which dust has sufficiently been removed by such a dedusting treatment are introduced into the catalytic reactor 4, in which the exhaust gases are brought into contact with a catalyst to decompose and thereby remove the dioxins which are contained in the exhaust gases.

As to the ceramic filter, conventional ones for dust removal are usable. Preferable examples of their materials include those which have heat resistance of not lower than 500° C., such as mullite, SiC, and cordierite. The shape of the ceramic filter is not particularly limited, but a honeycomb shape is preferred because its filtering area is wide and because its pressure loss is small. In addition, since the ceramic filter is set downstream from the electric dust collector, ceramic filters which exhibit a dust collection efficiency of not less than 90% for fine particles (about 0.1 $\mu$m) are preferred.

As to the catalyst, any may be used if it can decompose the dioxins. The catalyst can fitly be selected from among conventional ones for decomposing the dioxins. Above all, the following catalysts (1-1) and (1-2) which were previously proposed by the present applicant are preferably used (see the specification of Japanese Patent Application No. 11-180933). Incidentally, the pore diameter distributions in the catalysts (1-1) and (1-2) are measured by the mercury penetration method.

<Catalyst (1-1)>

This is a catalyst which includes the following components:

(a) titanium oxide, (b) vanadium oxide, and (c) an oxide of at least one element selected from the group consisting of manganese, cobalt, nickel, zinc, zirconium, niobium, molybdenum, tin, tantalum, lanthanum and cerium, and exhibits a pore diameter distribution having a peak in the range of 0.01 to 0.05 $\mu$m and another peak in the range of 0.1 to 0.8 $\mu$m.

Particularly preferable of such catalysts are those which have a total pore volume in the range of 0.2 to 0.6 cc/g in which: the pore volume of a group of pores having pore diameters in the range of 0.01 to 0.05 $\mu$m is in the range of 10 to 70% of the total pore volume, and that of another group of pores having pore diameters in the range of 0.1 to 0.8 $\mu$m is in the range of 10 to 70% of the total pore volume. In addition, catalysts of which the component (c) is molybdenum oxide have excellent activity and therefore are preferably used.

The content of the component (b) is preferably in the range of 0.1 to 25 weight % of the component (a), and the content of the component (c) is preferably in the range of 0.1 to 25 weight % of the component (a). The catalyst (1-1) has an average particle diameter preferably in the range of 0.001 to 100 $\mu$m, more preferably 0.01 to 100 $\mu$m. In addition, the catalyst (1-1) has a specific surface area preferably in the range of 30 to 250 m$^2$/g, more preferably 40 to 200 m$^2$/g, as measured by the BET method.

The catalyst (1-1) can be prepared by conventional processes for producing such a kind of catalyst except that the components (a) to (c) get contained as catalytic components. The catalyst having the above pore diameter distribution can also easily be obtained by conventional processes, for example, comprising the step of: (1) adjusting the addition amounts of molding assistants, such as starch, and water when preparing the catalyst; or (2), in the kneading step, adding a resin which decomposes or volatilizes in the catalyst-calcining step.

<Catalyst (1-2)>

This is a catalyst which includes the following components:

(a) titanium oxide, (b) vanadium oxide, (c) an oxide of at least one element selected from the group consisting of manganese, cobalt, nickel, zinc, zirconium, niobium, molybdenum, tin, tantalum, lanthanum and cerium, and (d) a titanium-silicon-composite oxide, and exhibits a pore diameter distribution having a peak in the range of 0.01 to 0.05 $\mu$m and another peak in the range of 0.8 to 4 $\mu$m.

Particularly preferable of such catalysts are those which have a total pore volume in the range of 0.2 to 0.6 cc/g in which: the pore volume of a group of pores having pore diameters in the range of 0.01 to 0.05 $\mu$m is in the range of 20 to 80% of the total pore volume, and that of another group of pores having pore diameters in the range of 0.8 to 4 $\mu$m is in the range of 5 to 70% of the total pore volume. In addition, catalysts of which the component (c) is molybdenum oxide have excellent activity and therefore are preferably used.

The content of the component (b) is preferably in the range of 0.1 to 25 weight % of the component (a), and the content of the component (c) is preferably in the range of 0.1 to 25 weight % of the component (a), and the content of the component (d) is preferably in the range of 0.01 to 7 times by weight of the component (a). The catalyst (1-2) has an average particle diameter preferably in the range of 0.001 to 100 $\mu$m, more preferably 0.01 to 100 $\mu$m. In addition, the catalyst (1-2) has a specific surface area preferably in the range of 30 to 250 m$^2$/g, more preferably 40 to 200 m$^2$/g, as measured by the BET method.

The catalyst (1-2), similarly to the catalyst (1-1), can be prepared by conventional processes for producing such a kind of catalyst except that the components (a) to (d) get contained as catalytic components.

The shape of the catalysts (1-1) and (1-2) is not especially limited, but can fitly be selected from among shapes of such as plates, wavy plates, nets, honeycombs, columns, and cylinders. In addition, these catalysts may be used in the form supported on a supporter which has a shape selected from among shapes of such as plates, wavy plates, nets, honeycombs, columns, and cylinders, and comprises such as alumina, silica, cordierite, titania, or stainless steel.

The operational conditions of the electric dust collector 2, the ceramic filter 3, and the catalyst 4 are not particularly limited, but can fitly be determined in consideration of factors such as the type and properties of the exhaust gases and the required removability. The temperature at which the ceramic filter and the catalyst are used can fitly be selected within the operational temperature range of conventional electric dust collectors and is preferably in the range of 200 to 450° C. (but not including 450° C.), because exhaust gases as have been subjected to the dust collection treatment with the electric dust collector 2 is, usually, intactly introduced into the ceramic filter 3 and the catalyst 4. The space velocity of the exhaust gases at each of the ceramic filter 3 and the catalyst 4 is usually in the range of 100 to 100,000 h$^{-1}$ (STP), preferably 200 to 50,000 h$^{-1}$ (STP).

Figure 2:
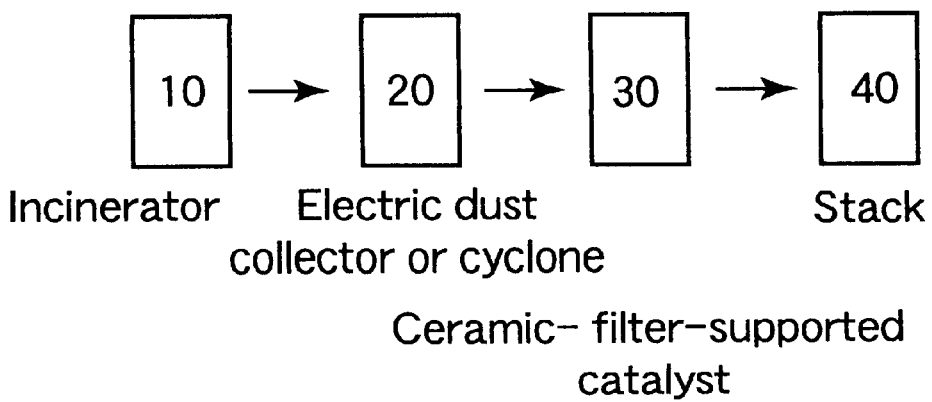
FIG. 2 is a systematic flowchart of the second process of the processes according to the present invention.

(Second Process):

FIG. 2 is a systematic flowchart of another process according to the present invention. In FIG. 2, "10" is an incinerator, "20" is an electric dust collector (or cyclone), "30" is a ceramic-filter-supported catalyst, and "40" is a stack.

In the process according to the present invention, exhaust gases from the incinerator 10 are dedusted by introducing the exhaust gases into the electric dust collector 20, and then treated with the ceramic-filter-supported catalyst 30 to decompose and thereby remove the dioxins which are contained in the exhaust gases. The degree of dedusting the exhaust gases is made almost the same as that in the first method.

The ceramic-filter-supported catalyst can easily be obtained by getting a dioxin-decomposable catalyst supported on a ceramic filter. As to the ceramic filter, conventional ones for dust removal are usable. Preferable examples of their materials include those which have heat resistance of not lower than 500° C., such as mullite, SiC, and cordierite. The shape of the ceramic filter is not particularly limited, but a honeycomb shape is preferred because its filtering area is wide and because its pressure loss is small. In addition, since the ceramic filter is set downstream from the electric dust collector, ceramic filters which exhibit a dust collection efficiency of not less than 90% for fine particles (about 0.1 $\mu$m) are preferred.

As to the catalyst, any may be used if it can decompose the dioxins. The catalyst can fitly be selected from among conventional ones for decomposing the dioxins. For example, the following catalyst (2-1) or (2-2) is usable.

<Catalyst (2-1)>

This is a catalyst which includes the following components:
 (a) titanium oxide,
 (b) vanadium oxide, and
 (c) an oxide of at least one element selected from the group consisting of tungsten, manganese, cobalt, nickel, zinc, zirconium, niobium, molybdenum, tin, tantalum, lanthanum and cerium.

<Catalyst (2-2)>

This is a catalyst which includes the following components:
 (a) titanium oxide,
 (b) vanadium oxide,
 (c) an oxide of at least one element selected from the group consisting of tungsten, manganese, cobalt, nickel, zinc, zirconium, niobium, molybdenum, tin, tantalum, lanthanum and cerium, and
 (d) a titanium-silicon-composite oxide.

Of these catalysts (2-1) and (2-2), those of which the component (c) is molybdenum oxide or tungsten oxide, particularly, molybdenum oxide, have excellent activity and therefore are preferably used. Incidentally, the content of each component in the catalyst (2-1) or (2-2) is the same as that in the below-mentioned catalyst (2-3) or (2-4).

Of the above catalysts for decomposing the dioxins, the following catalysts (2-3) and (2-4) which were previously proposed by the present applicant are preferably used (see the specification of Japanese Patent Application No. 11-180933). Incidentally, the pore diameter distributions in the catalysts (2-3) and (2-4) are measured by the mercury penetration method. As to the catalysts (2-3) and (2-4), those which are common to the catalysts (1-1) and (1-2) for the aforementioned first process are usable.

<Catalyst (2-3)>

This is a catalyst which includes the following components:
 (a) titanium oxide,
 (b) vanadium oxide, and
 (c) an oxide of at least one element selected from the group consisting of tungsten, manganese, cobalt, nickel, zinc, zirconium, niobium, molybdenum, tin, tantalum, lanthanum and cerium,
 and exhibits a pore diameter distribution having a peak in the range of 0.01 to 0.05 $\mu$m and another peak in the range of 0.1 to 0.8 $\mu$m.

Particularly preferable of such catalysts are those which have a total pore volume in the range of 0.2 to 0.6 cc/g in which: the pore volume of a group of pores having pore diameters in the range of 0.01 to 0.05 $\mu$m is in the range of 10 to 70% of the total pore volume, and that of another group of pores having pore diameters in the range of 0.1 to 0.8 $\mu$m is in the range of 10 to 70% of the total pore volume. In addition, catalysts of which the component (c) is molybdenum oxide or tungsten oxide, particularly, molybdenum oxide, have excellent activity and therefore are preferably used.

The content of the component (b) is preferably in the range of 0.1 to 25 weight % of the component (a), and the content of the component (c) is preferably in the range of 0.1 to 25 weight % of the component (a). The catalyst (2-3) has an average particle diameter preferably in the range of 0.001 to 100 $\mu$m, more preferably 0.01 to 100 $\mu$m. In addition, the catalyst (2-3) has a specific surface area preferably in the range of 30 to 250 m$^2$/g, more preferably 40 to 200 m$^2$/g, as measured by the BET method.

The catalyst (2-3) can be prepared by conventional processes for producing such a kind of catalyst except that the components (a) to (c) get contained as catalytic components. The catalyst having the above pore diameter distribution can also easily be obtained by conventional processes, for example, comprising the step of: (1) adjusting the addition amounts of molding assistants, such as starch, and water when preparing the catalyst; or (2), in the kneading step, adding a resin which decomposes or volatilizes in the catalyst-calcining step.

<Catalyst (2-4)>

This is a catalyst which includes the following components:
 (a) titanium oxide,
 (b) vanadium oxide,
 (c) an oxide of at least one element selected from the group consisting of tungsten, manganese, cobalt, nickel, zinc, zirconium, niobium, molybdenum, tin, tantalum, lanthanum and cerium, and
 (d) a titanium-silicon-composite oxide,
 and exhibits a pore diameter distribution having a peak in the range of 0.01 to 0.05 $\mu$m and another peak in the range of 0.8 to 4 $\mu$m.

Particularly preferable of such catalysts are those which have a total pore volume in the range of 0.2 to 0.6 cc/g in which: the pore volume of a group of pores having pore diameters in the range of 0.01 to 0.05 $\mu$m is in the range of 20 to 80% of the total pore volume, and that of another group of pores having pore diameters in the range of 0.8 to 4 $\mu$m is in the range of 5 to 70% of the total pore volume. In addition, catalysts of which the component (c) is molybdenum oxide or tungsten oxide, particularly, molybdenum oxide, have excellent activity and therefore are preferably used.

The content of the component (b) is preferably in the range of 0.1 to 25 weight % of the component (a), and the content of the component (c) is preferably in the range of 0.1 to 25 weight % of the component (a), and the content of the component (d) is preferably in the range of 0.01 to 7 times by weight of the component (a). The catalyst (2-4) has an average particle diameter preferably in the range of 0.001 to 100 μm, more preferably 0.01 to 100 μm. In addition, the catalyst (2-4) has a specific surface area preferably in the range of 30 to 250 m²/g, more preferably 40 to 200 m²/g, as measured by the BET method.

The catalyst (2-4), similarly to the catalyst (2-3), can be prepared by conventional processes for producing such a kind of catalyst except that the components (a) to (d) get contained as catalytic components.

The ceramic-filter-supported catalyst as used for the present invention, for example, can be prepared by the following procedure:

(1) the catalyst is pulverized and then dispersed into water to form a slurry, into which a ceramic filter is then immersed to get the catalytic components supported on the ceramic filter, and then the resultant product is dried and then calcined; or (2) water-soluble salts of the catalytic components are dissolved into water to prepare a uniformly mixed solution, into which a ceramic filter is then immersed to impregnate the ceramic filter with the solution, thereby getting the catalytic components supported on the ceramic filter, and then the resultant product is dried and then calcined; or (3) the titanium oxide or titanium-silicon-composite oxide is supported on a ceramic filter, and then the resultant product is dried and then calcined, and then a solution containing vanadium or another metal component is impregnated into and thereby supported on the resultant ceramic filter, and then the resultant product is dried and then calcined.

The amount of the supported catalyst is usually in the range of 1 to 20 weight %, preferably 2 to 15 weight %, of the ceramic filter. In the case where the supporting amount is too large, the porosity of the ceramic filter is so low that the pressure loss is much. On the other hand, in the case where the supporting amount is too small, sufficient catalytic activity is not obtained.

The operational conditions of the electric dust collector 20 and the ceramic-filter-supported catalyst 30 are not particularly limited, but can fitly be determined in consideration of factors such as the type and properties of the exhaust gases and the required removability.

The temperature at which the ceramic-filter-supported catalyst is used can fitly be selected within the operational temperature range of conventional electric dust collectors and is preferably in the range of 200 to 450° C. (but not including 450° C.), because exhaust gases as have been subjected to the dust collection treatment with the electric dust collector 20 is, usually, intactly introduced into the ceramic-filter-supported catalyst 30. The space velocity of the exhaust gases at the ceramic-filter-supported catalyst 30 is usually in the range of 100 to 100,000 h⁻¹ (STP), preferably 200 to 50,000 h⁻¹ (STP).

Incidentally, the ceramic-filter-supported catalyst as used for the present invention removes dioxins, contained in dust, and particulate dioxins, and further, has excellent decomposing activity upon gaseous dioxins, and is hence preferably used for the purification of the exhaust gases, containing these dioxins, from incineration facilities for disposing of industrial wastes and city wastes.

(Other Processes):

The present invention can be executed not only by the above first or second process, but also by various other processes. The invention may be carried out by the third process in which step (C) is carried out after step (B), that is, for example, a process in which a powder of the aforementioned catalyst is blown from upstream into the ceramic filter. In addition, acid gases (gases including such as HCl, Cl₂, or sulfur oxide) may also be removed from the exhaust gases by disposing of the exhaust gases by the first or second process and then passing the exhaust gases through such as a wet type scrubber. In the case where the above third process is carried out, the catalyst (1-1) or (1-2) for the aforementioned first process is preferably used.

(Effects and Advantages of the Invention):

Principal effects of the present invention are as follows.

(1) The dioxins can effectively be removed from the exhaust gases by merely equipping a ceramic filter and a catalyst to already existing incinerators having an electric dust collector or cyclone.

(2) The already existing incineration facilities can be modified at a low cost.

(3) The ceramic filter is so resistant to heat as to be operable in the high temperature region and, as a result, the exhaust gases can be introduced into the catalyst at high temperature, therefore the decomposition efficiency by the catalyst is so much enhanced that the amount of the catalyst can be reduced.

(4) Since the dedusting efficiency is enhanced, the durability of the catalyst becomes better, and the dioxins-removing efficiency is also heightened, and both particulate and gaseous dioxins can efficiently be removed, with the result that the dioxins concentration at the outlet can be reduced to a low concentration of not more than 0.1 ng-TEQ/Nm³.

(5) The dioxins can be removed from the exhaust gases stably for a long period of time.

(6) Since the dioxins can be decomposed by the catalyst in the range of 200 to 450° C. (but not including 450° C.), the catalyzability is so sufficiently exhibited that the dioxins-removing ratio is enhanced. In particular, the catalysts (1-1), (1-2), (2-3), and (2-4) more enhance the dioxins-removing ratio.

The process involving the use of the ceramic-filter-supported catalyst further has advantages in that: since the removal of the dioxins by the catalyst is carried out simultaneously with the dust removal, the ceramic filter and the catalyst can be formed into one body to make the apparatus compact.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

CATALYST PREPARATION EXAMPLE 1

A solution of 1.29 kg of ammonium metavanadate and 1.68 kg of oxalic acid in 5 liters of water and a solution of 1.23 kg of ammonium paramolybdate and 0.43 kg of monoethanolamine in 3 liters of water were added to 18 kg of a commercially available titanium oxide powder (DT-51 (trade name), produced by Millennium Inorganic Chemicals Limited). Then, 0.9 kg of phenol resin (Bellpearl (trade name), produced by Kanebo Co.) and 0.45 kg of starch (as a molding assistant) were further added to and mixed with the resulting mixture. The resulting mixture was kneaded with a kneader and then molded into a honeycomb form having an external form size of 80 mm square, an opening size of 4.0 mm, a wall thickness of 1.0 mm and a length of 500 mm with an extrusion molding machine. Thereafter, the resultant form was dried at 80° C. for 2 hours and then calcined at 450° C. for 5 hours under air atmosphere to obtain a catalyst (1).

The composition of this catalyst (1) was $V_2O_5:MoO_3:TiO_2=5:5:90$ (weight %). In addition, the pore diameter distribution of this catalyst (1) was measured by the mercury penetration method, with the result that the total pore volume was 0.41 cc/g, and that the pore volume of the first group of pores (having a pore diameter distribution peak within the range of 0.01 to 0.05 μm) and that of the second group of pores (having a pore diameter distribution peak within the range of 0.1 to 0.8 μm) were 35% and 57%, respectively, of the total pore volume. In addition, the specific surface area measured by the BET method was 75 $m^2/g$.

CATALYST PREPARATION EXAMPLE 2

An amount of 21.3 kg of Snowtex-20 (silica sol with an $SiO_2$ content of about 20 weight %, produced by Nissan Chemical Industries, Ltd.) was added to 700 liters of 10 weight % ammonia water, and then they were mixed together by stirring. Thereafter, 340 liters of a sulfuric acid solution of titanyl sulfate (125 g/liter as $TiO_2$, and sulfuric acid concentration=550 g/liter) was added dropwise under agitation. The resultant gel was left for 3 hours, and then filtered off, and then washed with water, and then dried at 150° C. for 10 hours. The resultant product was calcined at 500° C. for 5 hours under air atmosphere, and then ground with a hammer mill, and then classified with a classifier to obtain a powder having an average particle diameter of 10 μm. The composition of the resultant powder was $TiO_2:SiO_2=8.5:1.5$ (molar ratio). In an X-ray diffraction chart of this powder, no clear characteristic peak of $TiO_2$ or $SiO_2$ was seen, but a broad diffraction peak was seen, from which it was verified that the resultant powder was a titanium-silicon-composite oxide (Ti—Si-composite oxide) having an amorphous fine structure.

A solution of 1.29 kg of ammonium metavanadate and 1.68 kg of oxalic acid in 5 liters of water and a solution of 1.23 kg of ammonium paramolybdate and 0.43 kg of monoethanolamine in 3 liters of water were added to 9 kg of the above Ti—Si-composite oxide and 9 kg of a commercially available titanium oxide powder (DT-51 (trade name), produced by Millennium Inorganic Chemicals Limited). Then, 0.9 kg of phenol resin (Bellpearl (trade name), produced by Kanebo Co.) and 0.45 kg of starch (as a molding assistant) were further added to and mixed with the resulting mixture. The resulting mixture was kneaded with a kneader and then molded into a honeycomb form having an external form size of 80 mm square, an opening size of 4.0 mm, a wall thickness of 1.0 mm and a length of 500 mm with an extrusion molding machine. Thereafter, the resultant form was dried at 80° C. for 2 hours and then calcined at 450° C. for 5 hours under air atmosphere to obtain a catalyst (2).

The composition of this catalyst (2) was $V_2O_5:MoO_3:TiO_2$:(Ti—Si-composite oxide)=5:5:45:45 (weight %). In addition, the pore diameter distribution of this catalyst (2) was measured by the mercury penetration method, with the result that the total pore volume was 0.38 cc/g, and that the pore volume of the first group of pores (having a pore diameter distribution peak within the range of 0.01 to 0.05 μm) and that of the second group of pores (having a pore diameter distribution peak within the range of 0.8 to 4 μm) were 57% and 21%, respectively, of the total pore volume. In addition, the specific surface area measured by the BET method was 85 $m^2/g$.

EXAMPLE 1-1

As shown in FIG. 1, exhaust gases were purified by placing a honeycomb-form ceramic filter at the outlet (dioxins concentration: 1 ng-TEQ/$Nm^3$) of the electric dust collector and further placing the catalytic reactor downstream from the ceramic filter. The dioxins-removing ratio and the dioxins concentration at the outlet, as were in the initial stage or after 2,000 hours, 5,000 hours, or 10,000 hours, are shown in Table 1.

<Ceramic Filter>

Type: honeycomb-form ceramic filter made of cordierite (opening size=9 mm, wall thickness=1 mm, dust collection efficiency=99%)

Space velocity: 30,000 $h^{-1}$

Temperature: 250 to 350° C.

<Catalyst Layer>

Catalyst (1)

Space velocity: 4,000 $h^{-1}$

Temperature: 250 to 350° C.

Incidentally, the dioxins-removing ratio was determined in accordance with the following equation:

dioxins-removing ratio (%)=[{(dioxins concentration at inlet of ceramic filter)−(dioxins concentration at outlet of catalytic reactor)}/(dioxins concentration at inlet of ceramic filter)]×100

EXAMPLE 1-2

The exhaust gases were purified in the same manner as of Example 1-1 except that the catalyst (2) was used instead of the catalyst (1). The dioxins-removing ratio and the dioxins concentration at the outlet, as were in the initial stage or after 2,000 hours, 5,000 hours, or 10,000 hours, as shown in Table 1.

COMPARATIVE EXAMPLE 1-1

The exhaust gases were purified in the same manner as of Example 1-1 except that the exhaust gases were directly introduced into the catalytic reactor without the ceramic filter being furnished, and that the catalytic reactor temperature was 250° C. The dioxins-removing ratio and the dioxins concentration at the outlet are shown in Table 1.

Incidentally, the dioxins-removing ratio was determined in accordance with the following equation:

dioxins-removing ratio (%)=[{(dioxins concentration at inlet of catalytic reactor)−(dioxins concentration at outlet of catalytic reactor)}/(dioxins concentration at inlet of catalytic reactor)]×100

TABLE 1

| | Gas temperature (° C.) | Dioxins-removing ratio (%) | | | |
| --- | --- | --- | --- | --- | --- |
| | | Initial | After 2,000 hours | After 5,000 hours | After 10,000 hours |
| Example 1-1 | 250 | 95.5 (0.045) | 96.4 (0.046) | 95.3 (0.047) | 95.1 (0.049) |
| | 300 | 99.0 (0.010) | 99.0 (0.010) | 98.9 (0.011) | 98.9 (0.011) |
| | 350 | 99.5 (0.005) | 99.5 (0.005) | 99.5 (0.005) | 99.5 (0.005) |
| Example 1-2 | 250 | 96.7 (0.033) | 96.6 (0.034) | 96.6 (0.034) | 96.4 (0.036) |
| | 300 | 99.4 (0.006) | 99.3 (0.007) | 99.3 (0.007) | 99.3 (0.007) |
| | 350 | 99.7 (0.003) | 99.7 (0.003) | 99.7 (0.003) | 99.7 (0.003) |

TABLE 1-continued

| | Gas temperature (° C.) | Dioxins-removing ratio (%) | | | |
|---|---|---|---|---|---|
| | | Initial | After 2,000 hours | After 5,000 hours | After 10,000 hours |
| Comparative Example 1-1 | 250 | 87.3 (0.127) | 86.6 (0.134) | 85.6 (0.144) | 83.7 (0.163) |

The numerals in the parentheses show dioxins concentrations at the outlet (ng-TEQ/Nm$^3$).

CERAMIC-FILTER-SUPPORTED CATALYST PREPARATION EXAMPLE 1

A solution of 1.29 kg of ammonium metavanadate and 1.68 kg of oxalic acid in 5 liters of water and a solution of 1.23 kg of ammonium paramolybdate and 0.43 kg of monoethanolamine in 3 liters of water were added to 18 kg of a commercially available titanium oxide powder (DT-51 (trade name), produced by Millennium Inorganic Chemicals Limited). Then, 0.9 kg of phenol resin (Bellpearl (trade name), produced by Kanebo Co.) and 0.45 kg of starch (as a molding assistant) were further added to and mixed with the resulting mixture. The resulting mixture was kneaded with a kneader and then molded into pellets having the size of 5 mm$\phi$×5 mmL with an extrusion molding machine. Thereafter, the resultant form was dried at 80° C. for 2 hours and then calcined at 450° C. for 5 hours under air atmosphere to obtain a catalyst.

The composition of this catalyst was V$_2$O$_5$:MoO$_3$:TiO$_2$=5:5:90 (weight %). In addition, the pore diameter distribution of this catalyst was measured by the mercury penetration method, with the result that the total pore volume was 0.39 cc/g, and that the pore volume of the group of pores having a pore diameter distribution peak within the range of 0.01 to 0.05 $\mu$m and that of the group of pores having a pore diameter distribution peak within the range of 0.1 to 0.8 $\mu$m were 37% and 54%, respectively, of the total pore volume. The specific surface area measured by the BET method was 73 m$^2$/g.

The above catalyst was ground with a hammer mill, and 2.5 kg of the resultant powder was put into 10 liters of water and then stirred well, thus preparing a slurry solution. Into this slurry solution, a honeycomb-form ceramic filter made of cordierite (opening size=9 mm, wall thickness=1 mm, dust collection efficiency=99%) was immersed. After removing the excess of the slurry, the ceramic filter was dried at 60° C. for 2 hours and then calcined at 500° C. for 5 hours under air atmosphere to obtain a ceramic-filter-supported catalyst (1). The amount of the catalyst, as supported on the ceramic filter, was 10 weight % of the ceramic filter.

CERAMIC-FILTER-SUPPORTED CATALYST PREPARATION EXAMPLE 2

An amount of 21.3 kg of Snowtex-20 (silica sol with an SiO$_2$ content of about 20 weight %, produced by Nissan Chemical Industries, Ltd.) was added to 700 liters of 10 weight % ammonia water, and then they were mixed together by stirring. Thereafter, 340 liters of a sulfuric acid solution of titanyl sulfate (125 g/liter as TiO$_2$, and sulfuric acid concentration=550 g/liter) was gradually added dropwise under agitation. The resultant gel was left for 3 hours, and then filtered off, and then washed with water, and then dried at 150° C. for 10 hours. The resultant product was calcined at 500° C. for 5 hours under air atmosphere, and then ground with a hammer mill, and then classified with a classifier to obtain a powder having an average particle diameter of 10 $\mu$m. The composition of the resultant powder was TiO$_2$:SiO$_2$=8.5:1.5 (molar ratio). In an X-ray diffraction chart of this powder, no clear characteristic peak of TiO$_2$ or SiO$_2$ was seen, but a broad diffraction peak was seen, from which it was verified that the resultant powder was a titanium-silicon-composite oxide (Ti—Si-composite oxide) having an amorphous fine structure.

A solution of 1.29 kg of ammonium metavanadate and 1.68 kg of oxalic acid in 5 liters of water and a solution of 1.23 kg of ammonium paramolybdate and 0.43 kg of monoethanolamine in 3 liters of water were added to 9 kg of the above Ti—Si-composite oxide and 9 kg of a commercially available titanium oxide powder (DT-51 (trade name), produced by Millennium Inorganic Chemicals Limited). Then, 0.9 kg of phenol resin (Bellpearl (trade name), produced by Kanebo Co.) and 0.45 kg of starch (as a molding assistant) were further added to and mixed with the resulting mixture. The resulting mixture was kneaded with a kneader and then molded into pellets having the size of 5 mm$\phi$×5 mmL with an extrusion molding machine. Thereafter, the resultant form was dried at 80° C. for 2 hours and then calcined at 450° C. for 5 hours under air atmosphere to obtain a catalyst.

The composition of this catalyst was V$_2$O$_5$:MoO$_3$:TiO$_2$:(Ti—Si-composite oxide)=5:5:45:45 (weight %). In addition, the pore diameter distribution of this catalyst was measured by the mercury penetration method, with the result that the total pore volume was 0.37 cc/g, and that the pore volume of the group of pores having a pore diameter distribution peak within the range of 0.01 to 0.05 $\mu$m and that of the group of pores having a pore diameter distribution peak within the range of 0.8 to 4 $\mu$m were 55% and 20%, respectively, of the total pore volume. The specific surface area measured by the BET method was 73 m$^2$/g.

The above catalyst was ground with a hammer mill, and 2.5 kg of the resultant powder was put into 10 liters of water and then stirred well, thus preparing a slurry solution. Into this slurry solution, the same ceramic filter as that used in Ceramic-Filter-Supported Catalyst Preparation Example 1 was immersed. After removing the excess of the slurry, the ceramic filter was dried at 60° C. for 2 hours and then calcined at 500° C. for 5 hours under air atmosphere to obtain a ceramic-filter-supported catalyst (2). The amount of the catalyst, as supported on the ceramic filter, was 10 weight % of the ceramic filter.

CERAMIC-FILTER-SUPPORTED CATALYST PREPARATION EXAMPLE 3

An amount of 2.5 kg of the same titanium oxide powder and 0.5 kg of the same phenol resin as those used in Ceramic-Filter-Supported Catalyst Preparation Example 1 were put into 10 liters of water and then stirred well, thus preparing a slurry solution. Into this slurry solution, the same ceramic filter as that used in Ceramic-Filter-Supported Catalyst Preparation Example 1 was immersed. After removing the excess of the slurry, the ceramic filter was dried at 60° C. for 2 hours and then calcined at 500° C. for 5 hours under air atmosphere to obtain a ceramic-filter-supported titanium oxide. The amount of the titanium oxide, as supported on the ceramic filter, was 10 weight % of the ceramic filter.

Next, a uniform solution was prepared by mixing a solution of 1.16 kg of ammonium metavanadate and 0.21 kg of oxalic acid in 5 liters of water with a solution of 0.154 kg of ammonium paramolybdate and 0.048 kg of monoethanolamine in 5 liters of water. The above ceramic-filter-supported titanium oxide was immersed into this solution and then dried at 80° C. for 2 hours and then calcined at 450° C. for 5 hours under air atmosphere, thus preparing a ceramic-filter-supported catalyst (3). In this case, the composition of the catalytic components was $V_2O_5:MoO_3:TiO_2=5:5:90$ (weight %). The amount of these catalytic components, as supported on the ceramic filter, was 10 weight % of the ceramic filter.

CERAMIC-FILTER-SUPPORTED CATALYST PREPARATION EXAMPLE 4

A ceramic-filter-supported catalyst (4) was prepared in the same manner as of Ceramic-Filter-Supported Catalyst Preparation Example 3 except that the Ti—Si-composite oxide as prepared in Ceramic-Filter-Supported Catalyst Preparation Example 2 was used in addition to the titanium oxide. In this case, the composition of the catalytic components was $V_2O_5:MoO_3:TiO_2:(Ti-Si$-composite oxide)= 5:5:45:45 (weight %). The amount of these catalytic components, as supported on the ceramic filter, was 10 weight % of the ceramic filter.

CERAMIC-FILTER-SUPPORTED CATALYST PREPARATION EXAMPLE 5

A catalyst was prepared in the same manner as of Ceramic-Filter-Supported Catalyst Preparation Example 2 except that tungsten was used instead of molybdenum. The composition of this catalyst was $V_2O_5:WO_3:TiO_2:(Ti-Si$-composite oxide)=5:5:45:45 (weight %). In addition, the pore diameter distribution of this catalyst was measured by the mercury penetration method, with the result that the total pore volume was 0.40 cc/g, and that the pore volume of the group of pores having a pore diameter distribution peak within the range of 0.01 to 0.05 μm and that of the group of pores having a pore diameter distribution peak within the range of 0.8 to 4 μm were 58% and 24%, respectively, of the total pore volume. The specific surface area measured by the BET method was 83 m²/g.

Then, a ceramic-filter-supported catalyst (5) was obtained in the same manner as of Ceramic-Filter-Supported Catalyst Preparation Example 1 except that the above catalyst was used as the catalyst. The amount of the catalyst, as supported on the ceramic filter, was 10 weight % of the ceramic filter.

EXAMPLE 2-1

As is shown in FIG. 2, exhaust gases were purified by placing the ceramic-filter-supported catalyst (1) at the outlet (dioxins concentration: 1 ng-TEQ/Nm³) of the electric dust collector. The dioxins-removing ratio and the dioxins concentration at the outlet, as were in the initial stage or after 2,000 hours, 5,000 hours, or 10,000 hours, are shown in Table 2.

Space velocity: 2,000 h⁻¹
Temperature: 250 to 350° C.

Incidentally, the dioxins-removing ratio was determined in accordance with the following equation:

dioxins-removing ratio (%)=[{(dioxins concentration at inlet of ceramic-filter-supported catalyst)−(dioxins concentration at outlet of ceramic-filter-supported catalyst)}/(dioxins concentration at inlet of ceramic-filter-supported catalyst)]×100

EXAMPLES 2-2 TO 2-5

The exhaust gases were purified in the same manner as of Example 2-1 except that the ceramic-filter-supported catalyst (2), (3), (4), or (5) was used instead of the ceramic-filter-supported catalyst (1). The dioxins-removing ratio and the dioxins concentration at the outlet, as were in the initial stage or after 2,000 hours, 5,000 hours, or 10,000 hours, are shown in Table 2.

TABLE 2

|  | Gas temperature (° C.) | Dioxins-removing ratio (%) | | | |
|---|---|---|---|---|---|
|  |  | Initial | After 2,000 hours | After 5,000 hours | After 10,000 hours |
| Example 2-1 | 250 | 95.5 (0.045) | 95.3 (0.047) | 95.0 (0.050) | 94.5 (0.055) |
|  | 300 | 99.0 (0.010) | 98.9 (0.011) | 98.8 (0.012) | 98.7 (0.013) |
|  | 350 | 99.5 (0.005) | 99.5 (0.005) | 99.5 (0.005) | 99.4 (0.006) |
| Example 2-2 | 250 | 96.7 (0.033) | 96.5 (0.035) | 96.3 (0.037) | 95.9 (0.041) |
|  | 300 | 99.4 (0.006) | 99.3 (0.007) | 99.3 (0.007) | 99.1 (0.009) |
|  | 350 | 99.7 (0.003) | 99.7 (0.003) | 99.7 (0.003) | 99.6 (0.004) |
| Example 2-3 | 250 | 94.7 (0.053) | 94.5 (0.055) | 94.2 (0.058) | 93.7 (0.063) |
| Example 2-4 | 250 | 96.1 (0.039) | 95.9 (0.041) | 95.7 (0.043) | 95.2 (0.048) |
| Example 2-5 | 250 | 95.2 (0.048) | 95.0 (0.050) | 94.7 (0.053) | 94.2 (0.056) |

The numerals in the parentheses show dioxins concentrations at the outlet (ng-TEQ/Nm³).

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for the purification of exhaust gases containing dioxins, which process comprises the steps of:
   (A) dedusting incinerator exhaust gases with an electric dust collector or cyclone to reduce the amount of dust in said exhaust gases and to produce dedusted exhaust gases containing said dioxins and then
   (B) bringing said dedusted exhaust gases into contact with a catalyst and decomposing said dioxins in said dedusted exhaust gases and
   (C) treating the dedusted exhaust gases with a ceramic filter, where said catalyst and said ceramic filter are independent from said electric dust collector or cyclone; wherein said step (B) is carried out after said step (C), and wherein said catalyst is a catalyst (1-1) or (1-2), wherein said catalyst (1-1) comprises titanium oxide, vanadium oxide, and an oxide of at least one element selected from the group consisting of manganese, cobalt, nickel, zinc, zirconium, niobium, molybdenum, tin, tantalum, lanthanum and cerium, and exhibits a pore diameter distribution having a peak in the range of 0.01 to 0.05 μm and another peak in the range of 0.1 to 0.8 μm, and wherein said catalyst (1-2) comprises titanium oxide, vanadium oxide, an oxide of at least one element selected from the group consisting of manganese, cobalt, nickel, zinc, zirconium, niobium, molybdenum, tin, tantalum, lanthanum and cerium, and a titanium-silicon-composite oxide, and exhibits a pore diameter distribution having a peak in the range of 0.01 to 0.05 μm and another peak in the range of 0.8 to 4 μm.

2. The process of claim 1, wherein said dedusting step reduces a dust concentration of said exhaust gases to about 20 mg/m$^3$ to about 100 mg/m$^3$ to produce dedusted gases, and wherein said process comprises feeding said dedusted gases to said catalyst and ceramic filter.

3. The process of claim 2, wherein said ceramic filter is positioned downstream of said electric dust collector or cyclone and wherein said ceramic filter has a dust collection efficiency of not less than 90% for fine particles having a particle size of about 0.1 μm.

4. The process of claim 3, wherein said ceramic filter is made form a material selected from the group consisting of mullite, SiC and cordierite.

5. The process of claim 1, wherein said catalyst is produced by forming a mixture of titanium oxide, a vanadate compound and a metal compound containing a metal selected from the group consisting of manganese, cobalt, nickel, zinc, zirconium, niobium, molybdenum, tin, tantalum, lanthanum and cerium, said mixture further comprising a molding assistant, molding said mixture to form a device, and calcining said device.

6. A process for the purification of exhaust gases containing dioxins, which process comprises the steps of:

(A) dedusting incinerator exhaust gases with an electric dust collector or cyclone to reduce the amount of dust in said exhaust gases and to produce dedusted exhaust gases containing said dioxins and then (B) bringing said dedusted exhaust gases into contact with a catalyst and decomposing the dioxins in said dedusted exhaust gases, and (C) treating the dedusted exhaust gases with a ceramic filter, where said catalyst and said ceramic filter are independent from said electric dust collector or cyclone, wherein said step (B) is carried out at the same time as step (C), and wherein said catalyst is a catalyst (2-1) or (2-2);

wherein said catalyst (2-1) comprises titanium oxide, vanadium oxide, and an oxide of at least one element selected from the group consisting of tungsten, manganese, cobalt, nickel, zinc, zirconium, niobium, molybdenum, tin, tantalum, lanthanum and cerium; and wherein said catalyst (2-2) comprises titanium oxide, vanadium oxide, an oxide of at least one element selected from the group consisting of tungsten, manganese, cobalt, nickel, zinc, zirconium, niobium, molybdenum, tin, tantalum, lanthanum and cerium, and a titanium-silicon-composite oxide.

7. A process according to claim 6, wherein the exhaust gases are brought into contact with a ceramic-filter-supported catalyst.

8. A process according to claim 6, wherein the catalyst is the following catalyst (2-3) or (2-4):

wherein the catalyst (2-3) comprises:
(a) titanium oxide,
(b) vanadium oxide, and
(c) an oxide of at least one element selected from the group consisting of tungsten, manganese, cobalt, nickel, zinc, zirconium, niobium, molybdenum, tin, tantalum, lanthanum and cerium, and exhibits a pore diameter distribution having a peak in the range of 0.01 to 0.05 μm and another peak in the range of 0.1 to 0.8 μm;

and wherein the catalyst (2-4) comprises:
(a) titanium oxide,
(b) vanadium oxide,
(c) an oxide of at least one element selected from the group consisting of tungsten, manganese, cobalt, nickel, zinc, zirconium, niobium, molybdenum, tin, tantalum, lanthanum and cerium, and
(d) a titanium-silicon-composite oxide, and exhibits a pore diameter distribution having a peak in the range of 0.01 to 0.05 μm and another peak in the range of 0.8 to 4 μm.

9. A process for the purification of exhaust gases containing dioxins, said process comprising the steps of: dedusting incinerator exhaust gases in a dedusting apparatus to reduce the amount of dust in said exhaust gases and produce dedusted exhaust gases containing said dioxins; and then bringing the dedusted exhaust gases into contact with a catalyst apparatus having a catalyst and decomposing said dioxins in said exhaust gases wherein said catalyst apparatus is independent of said dedusting apparatus; and wherein said catalyst is selected from the group consisting of catalyst (1-1) and (1-2), wherein said catalyst (1-1) is titanium oxide, vanadium oxide, and an oxide of at least one element selected from the group consisting of manganese, cobalt, nickel, zinc, zirconium, niobium, molybdenum, tin, tantalum, lanthanum and cerium, and said catalyst (1-2) is titanium oxide, vanadium oxide, an oxide of at least one element selected from the group consisting of, manganese, cobalt, nickel, zinc, zirconium, niobium, molybdenum, tin, tantalum, lanthanum and cerium, and a titanium-silicon-composite oxide.

10. A process for the purification of exhaust gases containing dioxins, said process comprising the steps of: dedusting incinerator exhaust gases in a dedusting apparatus to reduce the amount of dust in the exhaust gases and to obtain dedusted exhaust gases containing said dioxins; and then bringing the dedusted exhaust gases into contact with a catalyst apparatus having a catalyst, and decomposing said dioxins in said exhaust gases, wherein said catalyst apparatus is independent of said dedusting apparatus, and wherein said catalyst is a catalyst (2-1) or (2-2);

wherein said catalyst (2-1) comprises titanium oxide, vanadium oxide, and an oxide of at least one element selected from the group consisting of tungsten, manganese, cobalt, nickel, zinc, zirconium, niobium, molybdenum, tin, tantalum, lanthanum and cerium; and wherein said catalyst (2-2) comprises titanium oxide, vanadium oxide, an oxide of at least one element selected from the group consisting of tungsten, manganese, cobalt, nickel, zinc, zirconium, niobium, molybdenum, tin, tantalum, lanthanum and cerium, and a titanium-silicon-composite oxide.

11. A process according to claim 10, wherein said catalyst (2-1) exhibits a pore diameter distribution having a peak in the range of 0.01 to 0.05 μm and another peak in the range of 0.1 to 0.8 μm, and said catalyst (2-2) exhibits a pore diameter distribution having a peak in the range of 0.01 to 0.05 μm and another peak in the range of 0.8 to 4 μm.

12. A process for the purification of exhaust gases containing dioxins, which process comprises the steps of:

dedusting incinerator exhaust gases with a electric dust collector or cyclone to reduce the amount of dust in the exhaust gases and produce a dedusted exhaust gas containing said dioxins and having a dust concentration of about 20 mg/m$^3$ to about 100 mg/m$^3$ and then bringing said dedusted exhaust gases into contact with a catalyst and treating the dedusted exhaust gases with a ceramic filter, where said catalyst and said ceramic filter are independent from said electric dust collector or cyclone.

13. The process of claim 12, wherein said ceramic filter is positioned downstream of said electric dust collector or cyclone and wherein said ceramic filter has a dust collection efficiency of not less than 90% for fine particles having a particle size of about 0.1 $\mu$m.

* * * * *